United States Patent
Gonzales, Jr. et al.

(10) Patent No.: US 10,333,954 B2
(45) Date of Patent: *Jun. 25, 2019

(54) AUTOMATIC DETECTION OF HIDDEN LINK MISMATCHES WITH SPOOFED METADATA

(71) Applicant: eBay Inc., San Jose, CA (US)

(72) Inventors: Sergio Pinzon Gonzales, Jr., San Jose, CA (US); Romi Akpala, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,193

(22) Filed: Mar. 20, 2018

(65) Prior Publication Data

US 2018/0212983 A1 Jul. 26, 2018

Related U.S. Application Data

(63) Continuation of application No. 14/976,549, filed on Dec. 21, 2015, now Pat. No. 9,954,877.

(51) Int. Cl.
*H04L 29/00* (2006.01)
*H04L 29/06* (2006.01)

(52) U.S. Cl.
CPC .......... *H04L 63/1416* (2013.01); *H04L 63/10* (2013.01); *H04L 63/102* (2013.01); *H04L 63/1483* (2013.01)

(58) Field of Classification Search
CPC ... H04L 63/102; H04L 63/1416; H04L 63/10; H04L 63/1483
See application file for complete search history.

(56) References Cited

U.S. PATENT DOCUMENTS

| | | |
|---|---|---|
| 8,271,588 B1 | 9/2012 | Bruno et al. |
| 8,484,741 B1 | 7/2013 | Chapman |
| 8,769,258 B2 | 7/2014 | Stewart et al. |
| 8,849,730 B2 | 9/2014 | Winn et al. |
| 8,984,289 B2 | 3/2015 | Oliver et al. |

(Continued)

FOREIGN PATENT DOCUMENTS

| | | |
|---|---|---|
| CN | 108437192 A | 8/2018 |
| EP | 3394765 A1 | 10/2018 |
| WO | 2017/112572 A1 | 6/2017 |

OTHER PUBLICATIONS

International Search Report received for PCT Application No. PCT/US2016/067451, dated Feb. 23, 2017, 2 pages.

(Continued)

*Primary Examiner* — Don G Zhao
(74) *Attorney, Agent, or Firm* — SBMC (57) ABSTRACT

Example methods and systems directed to an Alert Manager are described. According to various embodiments, the Alert Manager detects receipt of a message. The message includes a selectable functionality for accessing an external resource and message data indicative of a source of the message. The Alert Manager predicts when a recipient of the message will interact with the selectable functionality. Prior to the recipient's predicted interaction with the selectable functionality, the Alert Manager generates a message alert feature based on a degree of a difference between the external resource and the source of the message.

20 Claims, 8 Drawing Sheets

(56) References Cited

U.S. PATENT DOCUMENTS

| | | | |
|---|---|---|---|
| 9,674,129 B1 | 6/2017 | Everton et al. | |
| 9,774,522 B2 | 9/2017 | Vasseur et al. | |
| 9,954,877 B2 | 4/2018 | Gonzales, Jr. et al. | |
| 2002/0059078 A1 | 5/2002 | Valdes et al. | |
| 2005/0198142 A1 | 9/2005 | Yamakami | |
| 2007/0006026 A1 | 1/2007 | Roychowdhary et al. | |
| 2007/0083670 A1 | 4/2007 | Kelley et al. | |
| 2007/0112814 A1 | 5/2007 | Cheshire | |
| 2007/0250920 A1* | 10/2007 | Lindsay | G06F 21/31 726/7 |
| 2008/0172738 A1 | 7/2008 | Bates et al. | |
| 2008/0172741 A1* | 7/2008 | Reumann | H04L 63/1441 726/23 |
| 2008/0256187 A1 | 10/2008 | Kay | |
| 2010/0332601 A1 | 12/2010 | Walter et al. | |
| 2013/0054496 A1* | 2/2013 | Marianetti, II | G06N 20/00 706/12 |
| 2013/0086180 A1 | 4/2013 | Midgen et al. | |
| 2013/0159220 A1* | 6/2013 | Winn | G06F 17/30702 706/12 |
| 2013/0246383 A1 | 9/2013 | White et al. | |
| 2014/0207853 A1* | 7/2014 | Liu | H04L 61/30 709/203 |
| 2015/0142717 A1 | 5/2015 | Guiver et al. | |
| 2015/0156210 A1 | 6/2015 | Hunt et al. | |
| 2015/0195192 A1 | 7/2015 | Vasseur et al. | |
| 2015/0304350 A1 | 10/2015 | Lin | |
| 2016/0014151 A1* | 1/2016 | Prakash | H04L 63/1483 726/22 |
| 2017/0078321 A1* | 3/2017 | Maylor | H04L 63/1433 |
| 2017/0180398 A1 | 6/2017 | Gonzales, Jr. et al. | |

OTHER PUBLICATIONS

Written Opinion received for PCT Application No. PCT/US2016/067451, dated Feb. 23, 2017, 11 pages.

First Action Interview—Pre-Interview Communcation received for U.S. Appl. No. 14/976,549 dated Sep. 29, 2017, 5 pages.

Response to First Action Interview—Pre Interview Communication filed Oct. 19, 2017, for U.S. Appl. No. 14/976,549, dated Sep. 29, 2017, 3 pages.

Notice of Allowance received for U.S. Appl. No. 14/976,549, dated Dec. 20, 2017, 18 pages.

International Preliminary Report on Patentability received for PCT Application No. PCT/US2016/067451, dated Feb. 12, 2018, 11 pages.

Amendment filed on Jun. 20, 2018, for Korean Patent Application No. 10-2018-7017490, 5 pages.

* cited by examiner

AUTOMATIC DETECTION OF HIDDEN LINK MISMATCHES WITH SPOOFED METADATA

CLAIM OF PRIORITY

This Application is a continuation of U.S. application Ser. No. 14/976,549, filed Dec. 21, 2015, which is hereby incorporated by reference in its entirety.

TECHNICAL FIELD

The present application relates generally to the technical field of electronic messages and, in one specific example, providing an alert that corresponds with a suspicious message.

BACKGROUND

Many conventional computing contexts involve the use of computers to send and receive messages. Phishing is the attempt to acquire sensitive information such as usernames, passwords, by masquerading as a trustworthy entity in an electronic communication. Communications purporting to be from popular social web sites, auction sites, banks, online payment processors or information technology (IT) administrators are commonly used to lure unsuspecting victims. Phishing emails may contain links to websites that are infected with malware. Phishing is typically carried out by email spoofing or instant messaging, and it often directs users to enter details at a fake website whose look and feel are almost identical to the legitimate one.

BRIEF DESCRIPTION OF THE DRAWINGS

Some embodiments are illustrated by way of example and not limitation in the figures of the accompanying drawings.

DETAILED DESCRIPTION

Example methods and systems directed to an Alert Manager are described. In the following description, for purposes of explanation, numerous specific details are set forth in order to provide a thorough understanding of example embodiments. It will be evident, however, to one skilled in the art that the present invention may be practiced without these specific details.

According to various embodiments described herein, the Alert Manager detects receipt of a message. The message includes a selectable functionality (such as a hyperlink) for accessing an external resource and the message also includes message data indicative of a source of the message. The Alert Manager determines a degree of difference between an address of the external resource and an address of the source of the message. A threshold degree of difference indicates that the message is potentially fraudulent. The Alert Manager generates a message alert feature due to the threshold degree of a difference between the address of the external resource and the address of the source of the message.

The Alert Manager compares the recipient's current message browsing behavior against the recipient's historical message browsing behaviors in order to generate a prediction of when or if the recipient will interact with the selectable functionality. Prior to the recipient's predicted interaction with the selectable functionality, the Alert Manager presents the message alert feature. The message alert feature thereby results in a visual cue that the message is potentially fraudulent at a moment in time when the recipient is most likely to take an action with respect to the selectable functionality.

In an example embodiment, a client device associated with a user executes an instance of the Alert Manager. The Alert Manager monitors the user's browsing behaviors with respect to various email messages. For example, for a plurality of emails, the Alert Manager monitors an amount of time between when the user accesses a respective email and replies to that respective email. The Alert Manager monitors various input device patterns (such as computer mouse cursor movements) that occur prior to the user taking any type of action with regard to a received email. The Alert Manager monitors various input device patterns that occur with respect to emails that the user did not apply an action. The Alert Manager monitors such browsing behaviors to build an historical profile of the user. The historical profile of the user thereby includes historical message interaction data based on all the user's message browsing behaviors (e.g. message access, message reply, link selection, message closing, message deletion, accessing of message attachments) that allows the Alert Manager to determine the user's typical and expected message interaction behaviors.

The Alert Manager detects the user's client device has received a message that includes a selectable link (such as a URL) in the body of the message. The message header includes an address of the message's sender. The Alert Manager detects the user's client device has accessed the message and compares the user's current browsing behavior that corresponds with the message against the user's historical message interaction data in order to predict if and when the user will apply an input action to the selectable link, such as "clicking" on the link.

The Alert Manager compares a destination address that corresponds with the selectable link and the address of the message's sender. The Alert Manager determines there is a substantial difference between the text of the selectable link's destination address and the address of the message's sender. Such a substantial difference indicates that the message is potentially fraudulent and that the message sender may be attempting to convince the user to access the selectable link's destination address by gaining the user's trust via use of a false identity.

The Alert Manager determines that the user's current browsing behavior matches with a portion of the user's historical message interaction data that corresponds to previous messages that the user applied an affirmative action (e.g. replying to the message, selecting a link in the body of a message, etc.). Based on such a match, the Alert Manager utilizes the matching portion of the user's historical profile to generate prediction of when the user will most likely select the link within a certain time range. The Alert Manager generates a message alert feature, such as changing an appearance of the body of the message or the link. During the time range in which the Alert Manager predicts the user may select the link, the Alert Manager presents the alert feature in order to notify the user that replying to the message or selecting the link may result in accessing the link's potentially fraudulent destination address.

It is understood that, in various example embodiments, any of the modules generated by the Alert Manager described herein comprise source code that, when compiled by a computing devices (or computer devices), creates object code that causes the computing device(s) to perform various actions described herein. In other embodiments, any of the modules generated by the Alert Manager described herein comprise object code that causes the computing device(s) to perform various actions described herein.

Figure 1:
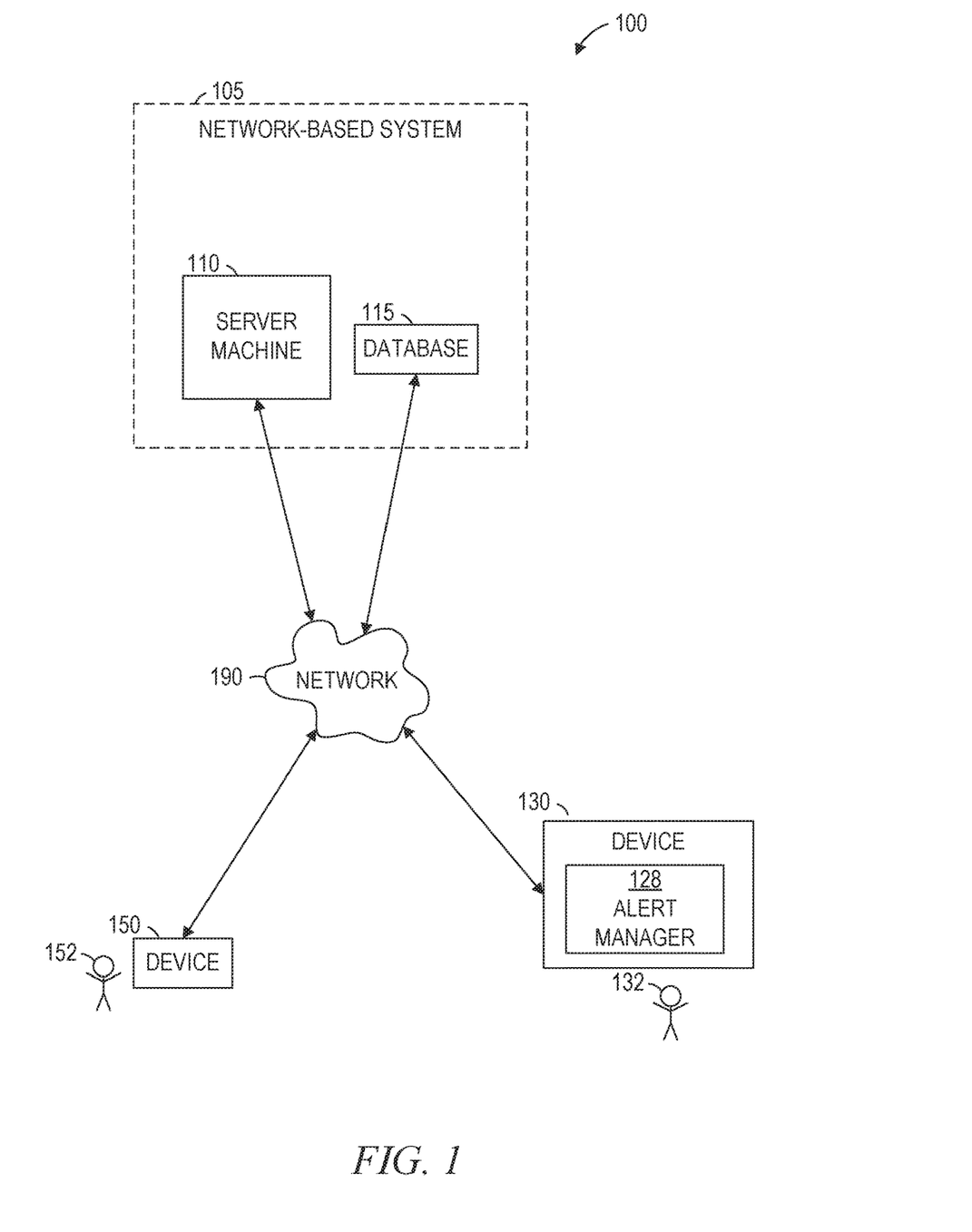
FIG. 1 is a network diagram illustrating a network environment suitable for an Alert Manager, according to some example embodiments.

FIG. 1 is a network diagram illustrating a network environment 100 suitable for an Alert Manager, according to some example embodiments. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 8. It is further understood that an Alert Manager can also be implemented in a computer system, in whole or in part, as described below with respect to FIG. 8.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 and device 130 may each run instances of the Alert Manager 128 described herein and may represent a desktop computer, a vehicle computer, a tablet computer, a navigational device, a portable media device, a smartphone, a wireless mobile device, a point-of-sale device, a kiosk computing device or a wearable device (e.g., a smart watch or smart glasses) belonging to the user 132.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system incorporating the Alert Manager 128 described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
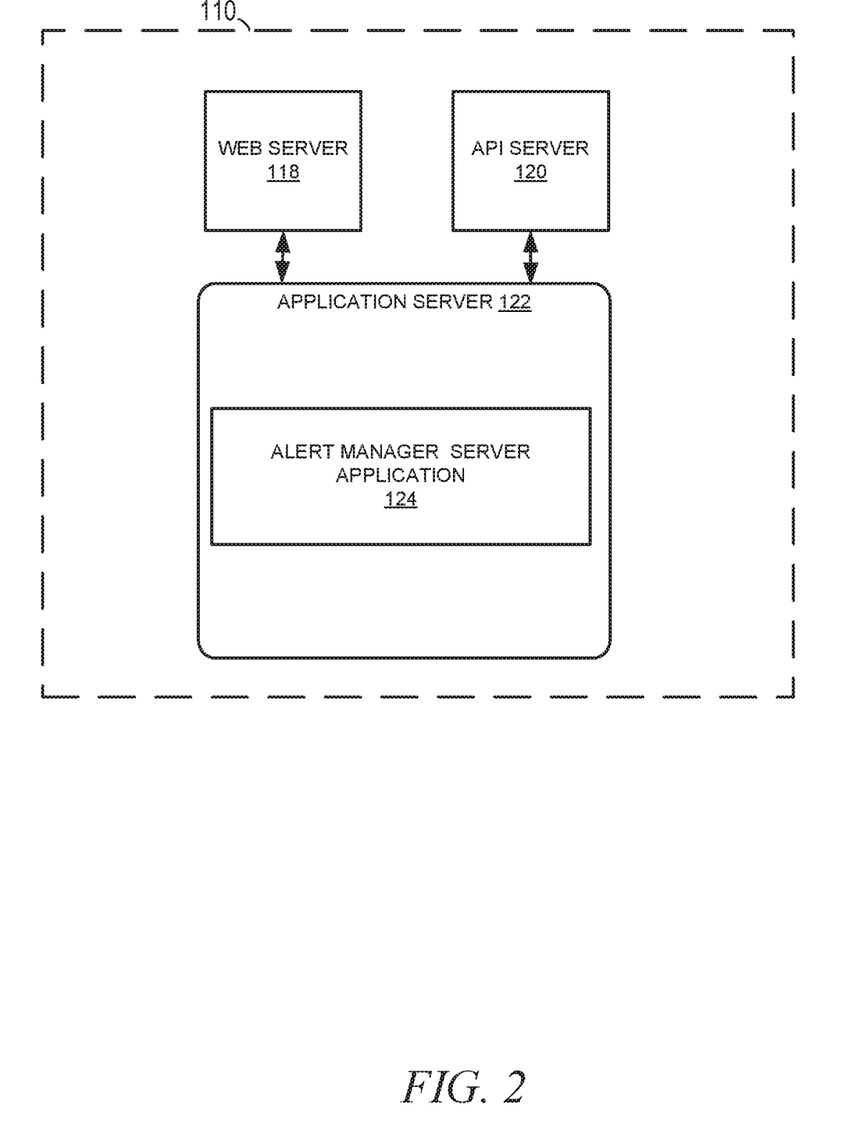
FIG. 2 is a block diagram illustrating components of a server machine suitable for Alert Manager, according to some example embodiments.

FIG. 2 is a block diagram illustrating components of the server machine 110, according to some example embodiments. The server machine 110 is shown as including an Application Program Interface (API) server 120 and a web server 118 that are coupled to, and provide programmatic and web interfaces respectively to, an application server(s) 122. The application server 122 hosts an Alert Manager server application 124.

In some embodiments, the Alert Manager server application 124 receives the browsing behaviors of the users 132, 152 of the devices 130, 150 with respect to how the users 132, 152 interact with various messages. The Alert Manager server application 124 generates and stores an historical profile for each user 132, 152 based on their respective browsing behaviors. A browsing behavior includes at least one of the following: accessing a message, replying to a message, viewing the message, closing the message, downloading an attachment of the message, selecting ("clicking on") a link included in the message. In other embodiments, it is understood that an historical profile can be generated and stored on a client device. That is, an instance of the Alert Manager application executed locally on the client device 130 monitors browsing behaviors of the user 132. The local Alert Manager application generates the user's 132 historical profile, for storage at the client device 130, based on the monitored browsing behaviors of the user 132.

While the Alert Manager server application 124 is shown in FIG. 2 to form part of the network-based system 105, it will be appreciated that, in alternative embodiments, the Alert Manager server application 124 may form part of a service that is separate and distinct from the network-based system 105.

Figure 3:
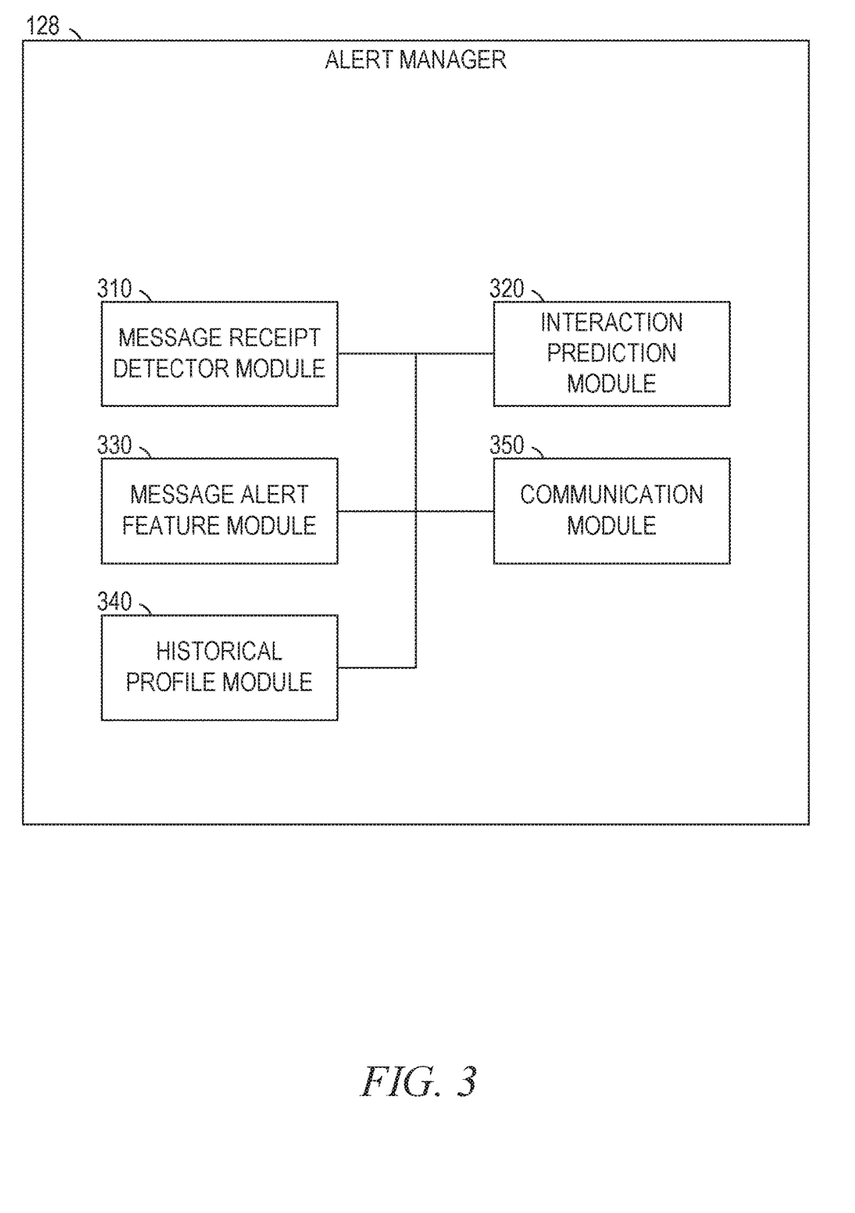
FIG. 3 is a block diagram illustrating various modules of an Alert Manager to cause a computing device to perform various actions consistent with some embodiments of the present invention described herein.

FIG. 3 is a block diagram illustrating various modules of an Alert Manager to cause a computing device to perform various actions consistent with some embodiments of the present invention described herein.

As illustrated in FIG. 3, the Alert Manager 128 includes a message receipt detector module 310, an interaction prediction module 320, a message alert feature module 330, an historical profile module 340 and a communication module 350. In example embodiments, the Alert Manager 128 is executed in any computing device, such as a client device 130, 150. It is understood that one, in other example embodiments, one or more of the modules 310, 320, 330, 340 can be part of the Alert Manager server application 124.

The message receipt detector module 310 is a hardware-implemented module which manages, controls, stores, and accesses information related to detecting receipt of a message(s) in a client device 130. The message receipt detector module 310 further compares text describing an external resource and to portions of message data indicative of a source of the message. The message receipt detector module 310 determines, based on the comparison, whether an extent of a discrepancy between the text describing the external resource and the message data indicates whether the message is potentially fraudulent. For example, an extent of discrepancy can be determined according to cosine similarity analysis between the text describing the external resource and the message data.

The interaction prediction module 320 is a hardware-implemented module which manages, controls, stores, and accesses information related to predicting a recipient's interaction with a message. The interaction prediction module 320 accesses historical message interaction data associated with the recipient. The interaction prediction module 320 compares at least one current interaction with the message (such as a message browsing pattern(s)) by the recipient against at least a portion of the historical message interaction data. The interaction prediction module 320 predicts, based on the comparison against the historical message interaction data, when a selection by the recipient of the selectable functionality will occur.

The message alert feature module 330 is a hardware-implemented module which manages, controls, stores, and accesses information related to generating a message alert feature. The message alert feature module 330 generates a modification to an appearance of at least a portion of a selectable functionality included in a body of a received message. The message alert feature module 330 generates a modification to a behavior of recipient input directed at the received message.

The historical profile module 340 is a hardware-implemented module which manages, controls, stores, and accesses information related to collect, store and process historical message interaction data in order to generate an historical profile associated with the message recipient.

The communication module 350 is a hardware-implemented module which manages, controls, stores, and accesses information related to the receipt and transmission of data between the Alert Manager 128 and the Alert Manager server application 124.

Figure 4:
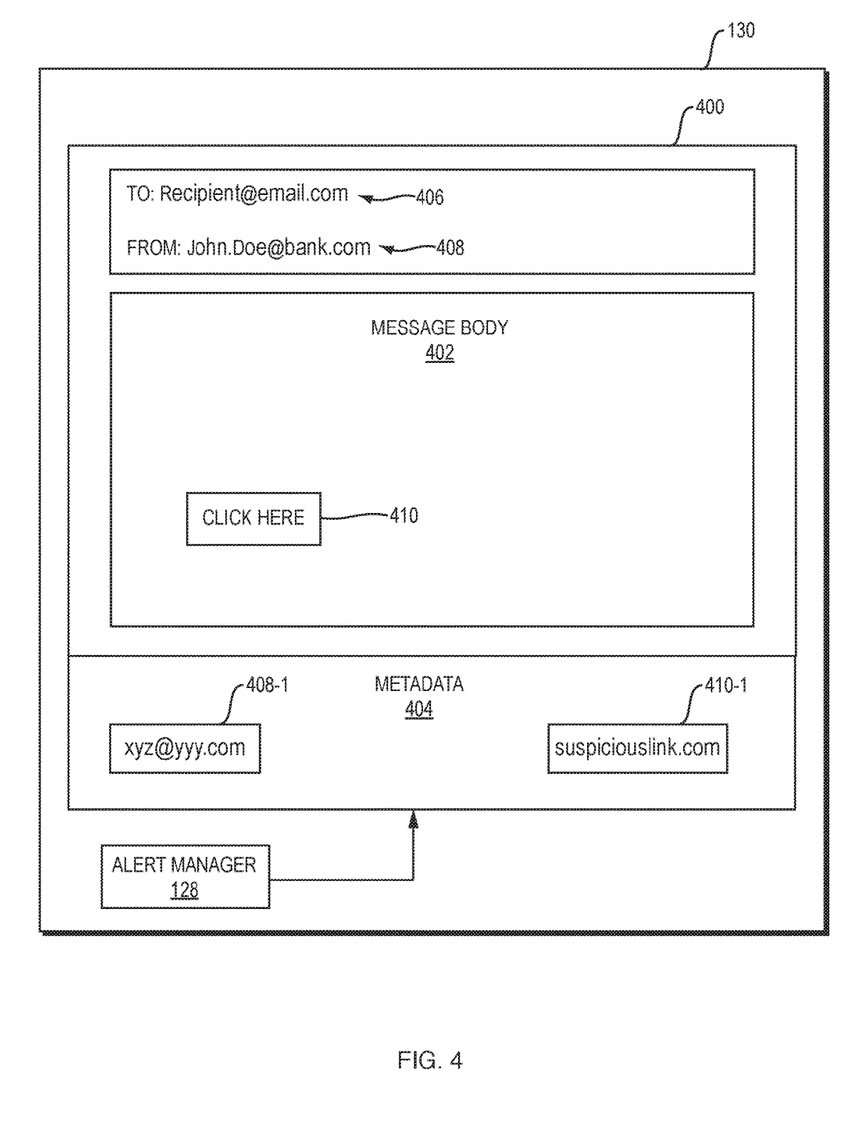
FIG. 4 is a block diagram illustrating a received message having a selectable functionality the Alert Manager determines may have been sent from a fraudulent source according to some example embodiments.

FIG. 4 is a block diagram illustrating a received message having a selectable functionality the Alert Manager determines may have been sent from a fraudulent source according to some example embodiments.

The Alert Manager 128 executes on a client device 130 and monitors a user's 132 activity with respect to a received message 400. For example, the Alert Manager 128 can be plug-in software that interacts with a messaging application. The Alert Manager 128 can be a software module extension that is embedded with a messaging application. In another example, the Alert Manager 128 can be a browser plug-in software module that interacts with a messaging website that is accessed through a web browser.

The received message 400 includes a destination address 406 (such as the user's email address) and a sender's address 408. According to a non-limiting example, text of the sender's address 408 indicates that the message 400 was sent from a bank URL domain, which may give an impression to the user 132 that the message 400 was sent from a trustworthy source. The message body includes a selectable functionality 410 that, upon selection, will direct the client device to access an external resource, such as a website, online portal and $3^{rd}$ party server. For example, upon selection the selectable functionality 410 may direct a browser running on the client device 130 to access an external URL. However, as shown in FIG. 4, the selectable functionality 410 does not provide the user 132 with any visual indication as to the external resource that will be accessed if the user 132 decides to select the selectable functionality 410. The selectable functionality 410 merely reads "CLICK HERE" and the user 132 will have to simply trust that the external resource actually is a URL (uniform resource locator) related to the bank domain and not fraudulent, suspicious or will not initiate a download of malware on the client device 132.

The message 400 also includes metadata 404 that is not visible to the user 132, but can be accessed by the Alert Manager 128. For example, the metadata 404 can be included in a message header. The metadata 404 includes the actual address 408-1 of the sender and the destination 410-1 of the selectable functionality 410. As shown in FIG. 4, the actual address 408-1 of the sender ("xyz@yyy.com") does not correspond to a bank URL domain. Further, the destination 410-1 ("suspiciouslink.com") of the selectable functionality 410 is also unrelated to the bank URL domain that is presented visually to the user 132 based on differences in text of the actual address 408-1 and the bank URL domain.

Figure 5:
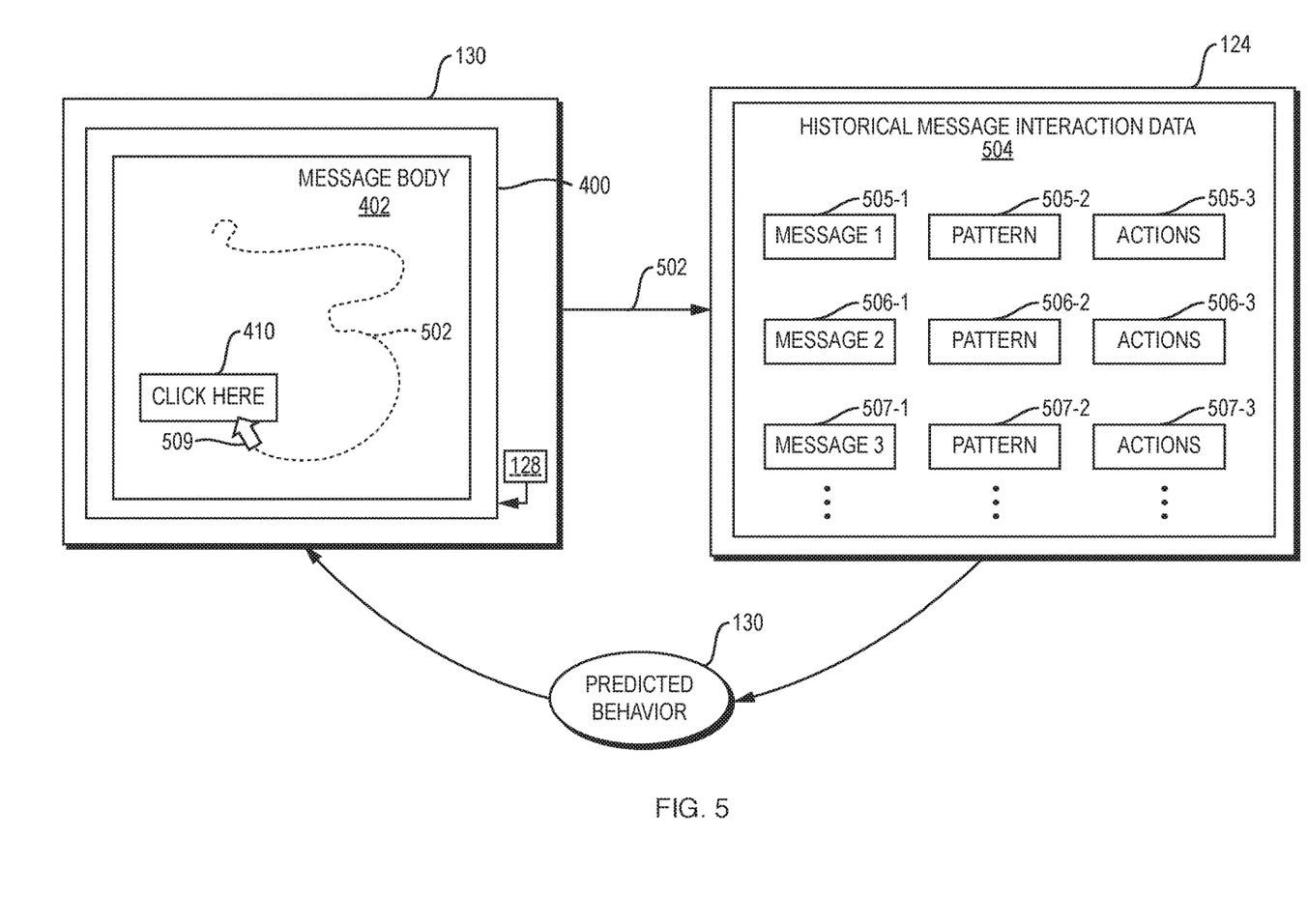
FIG. 5 is a block diagram illustrating the Alert Manager comparing current browsing behavior with historical browsing behaviors in order to predict when the selectable functionality will be selected according to some example embodiments.

FIG. 5 is a block diagram illustrating the Alert Manager comparing current browsing behavior with historical browsing behaviors in order to predict when the selectable functionality will be selected according to some example embodiments.

As the user 132 interacts with the received message, the Alert Manager 128 monitors the user's current browsing pattern 502 that is incidental to the user 132 accessing the message 400 via the client device 130. For example, the current browsing pattern 502 can be a pattern of an input device cursor (such as a computer mouse cursor). It is understood that the current browsing pattern 502 includes any user input (e.g. clicks, text, toggling between applications, closing of applications, selection of any functionality provided by a messaging application, etc.). The Alert Manager 128 executing on the client device 130 sends the current browsing pattern 502 to the Alert Manager server application 124.

The Alert Manager server application 124 receives the current browsing pattern 502 and compares the current browsing pattern 502 to historical message interaction data 504. The historical message interaction data 504 includes data based on the user's 132 browsing patterns with regard to previous messages 505-1, 506-1, 507-1 . . . . For example, for each previous message 505-1, 506-1, 507-1 received by the user 132, the historical message interaction data 504 has corresponding browsing patterns 505-2, 506-2, 507-2 . . . . In addition, the historical message interaction data 504 includes respective actions 505-3, 506-3, 507-3 . . . that the user 132 selected with regard to the previous messages 505-1, 506-1, 507-1 . . . . Such actions can be, for example, replying to a message, closing a message, deleting a message, forwarding a message, downloading a message attachment, selecting a URL provided in the body of a message.

The historical message interaction data 504 can also include data about the content or the sender of each previous messages 505-1, 506-1, 507-1. For example, the Alert Manager server application 124 can make comparisons between a current browsing pattern with respect to a message from a specific sender against historical message interaction data 504 that corresponds to previous messages received from the same specific sender. In another example, the Alert Manager server application 124 can make comparisons between a current browsing pattern with respect to the type of content in a message (such as a message containing a coupon, a message containing a receipt) against historical message interaction data 504 that corresponds to previous messages that had similar content. Such similar content can be determined according to a cosine similarity function for example.

The Alert Manager server application 124 compares the current browsing pattern 502 to patterns 505-2, 506-2, 507-2 in the historical message interaction data 504. For example, the current browsing pattern 502 includes data representing that various movements of a computer mouse cursor 509 and toggling between various applications occurred within a predefined time frame measured from when the user 132 accessed the message 400. The Alert Manager server application 124 identifies respective historical messages in the historical message interaction data 504 that are associated with browsing patterns that include similar computer mouse cursor movements and similar toggling between applications within the predefined time frame.

The Alert Manager server application 124 identifies the actions that were taken with regard to the similar historical messages. For example, such actions include selecting a link a body of a message, closing a message, sending a reply message. The Alert Manager server application 124 determines that selection of a link in a body of a message occurred in a threshold number of the similar historical messages.

The Alert Manager server application 124 further identifies an action time range from the similar historical messages. For example, of the similar historical messages in which link selection occurred, the Alert Manager server application 124 determines that such previous link selections occurred during a time range as measured from accessing the respective historical message, or from when a toggle between applications occurred, or from when a particular sequence of computer mouse cursor movements occurred. Based on the threshold number of the similar historical messages that resulted in link selection, the Alert Manager server application 124 generates a prediction 508 that the user 132 will select the link 410 during the action time range. The Alert Manager server application 124 sends the prediction 508, along with the action time range, to the client device 130.

It is understood that in example embodiments, the historical message interaction data 504 can be generated by the Alert Manager 128 executing on the client device 130. The historical message interaction data 504 can further be stored and accessed at the client device 130, such that the Alert Manager 128 executing on the client device 130 preforms respective comparisons in order to predict the user's 132 behavior.

Figure 6:
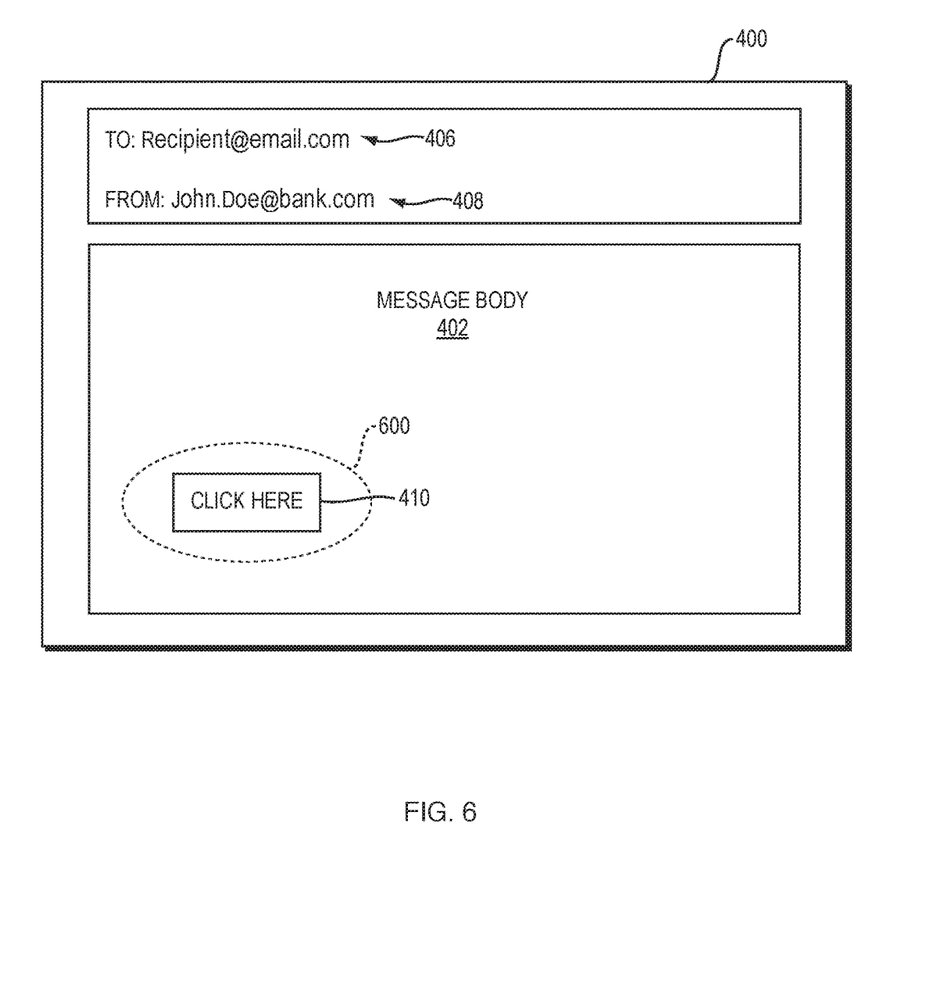
FIG. 6 is a block diagram illustrating the Alert Manager applying an alert message feature to a received message according to some example embodiments.

FIG. 6 is a block diagram illustrating the Alert Manager applying an alert message feature to a received message according to some example embodiments.

The Alert Manager 128 generates an alert feature 600. For example, the alert feature 600 can be a highlighting effect that surrounds the selectable link 410. In another example embodiment, the alert feature can be a change in an appearance of the selectable link, such as a change in color, text and/or size. In another example embodiment, the alert feature can be a change in a position of the selectable link 410 in the message body 402. In another example embodiment, the alert feature can be a change of how many mouse computer clicks are required to trigger selection of the selectable link 410.

In another example embodiment, the alert feature can be a change a behavior of user input received by the client device 130. For example, the alert feature can be a modification of presentation of how a computer mouse cursor visually appears to move on a display area of the client device 130. That is, the Alert Manager 128 causes the cursor to move slower or to blink. In another example embodiment, the alert feature may change the size, shape, or position of the cursor with respect to the selectable link 410.

Figure 7:
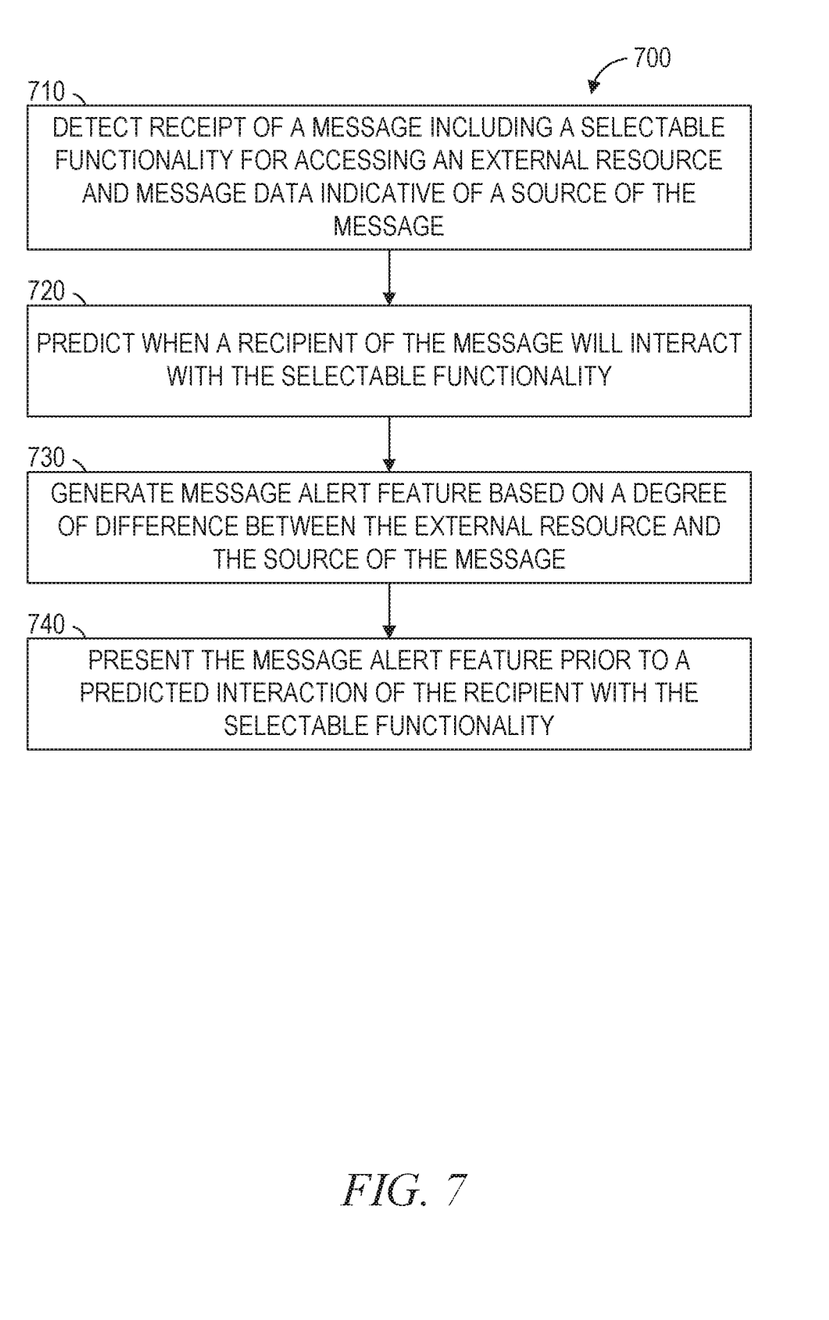
FIG. 7 is a flowchart illustrating operations of an Alert Manager according to some example embodiments.

FIG. 7 is a flowchart 700 illustrating operations of an Alert Manager according to some example embodiments.

At operation 710, the Alert Manager 128 detects receipt of a message. The message includes a selectable functionality 410 for accessing an external resource 410-1 and message data 408, 408-1 indicative of a source of the message. Such detection of message can be, for example, when an email arrives at its destination SMTP server, when the email is downloaded to a message recipient's device, when email is selected for reading but not yet displayed to the message recipient, when the email begins to be displayed to the message recipient, or when the email is fully displayed to the message recipient.

Responsive to detection of receipt of the message 400, the Alert Manager 128 compares text 410-1 describing the external resource ("suspiciouslink.com") against a portion of the address 408 of the message's sender ("bank.com"). For example, the Alert Manager 128 determines a cosine similarity score between the text 410-1 and the portion of the address 408.

In another example embodiment, the Alert Manager 128 compares text 410-1 describing the external resource ("suspiciouslink.com") against a portion of the actual address 408-1 ("yyy.com") of the sender provided in message metadata 404. For example, the Alert Manager 128 determines a cosine similarity score between the text 410-1 and the portion of the actual address 408-1. The Alert Manager 128 can further compare a portion of the actual address 408-1 ("yyy.com") of the sender provided in message metadata 404 against a portion of the address 408 ("bank.com") of the message's sender that is displayed in the message 400. For example, the Alert Manager 128 determines a cosine similarity score between the respective portions of the addresses 408, 408-1.

The Alert Manager 128 determines, based on the comparison, whether an extent of a discrepancy between the text describing the external resource and the message data meets a suspiciousness threshold. For example, if a cosine similarity score resulting from comparing the text of the address 410-1 of the external resource ("suspiciouslink.com")

against the portion of address 408 of the message's sender ("bank.com") fails to meet a threshold score, the Alert Manager 128 determines the message 400 is potentially fraudulent.

At operation 720, the Alert Manager 128 predicts when a recipient of the message will interact with the selectable functionality. For example, the Alert Manager 128 compares the user's current browsing behavior 502 against the user's historical message interaction data 504 in order to predict 508 if and when the user will apply an input action to the selectable link 410, such as "clicking" on the link.

At operation 730, the Alert Manager 128 generates a message alert feature based on a degree of difference between the external resource and the source of the message. For example, the Alert Manager 128 generates a message alert feature 600, such as changing an appearance of the body 402 of the message or the link 410. During the time range in which the Alert Manager predicts the user may select the link 410, the Alert Manager presents the message alert feature 600 in order to notify the user 132 that selecting the link 410 may result in accessing the link's potentially fraudulent destination address 410-1.

At operation 740, the Alert Manager 128 presents the message alert feature prior to a predicted interaction of the recipient with the message.

When these effects are considered in aggregate, one or more of the methodologies described herein may obviate a need for certain efforts or resources that otherwise would be involved in Alert Manager. Efforts expended by a user in the Alert Manager may be reduced by one or more of the methodologies described herein. Computing resources used by one or more machines, databases, or devices (e.g., within the network environment 100) may similarly be reduced.

Figure 8:
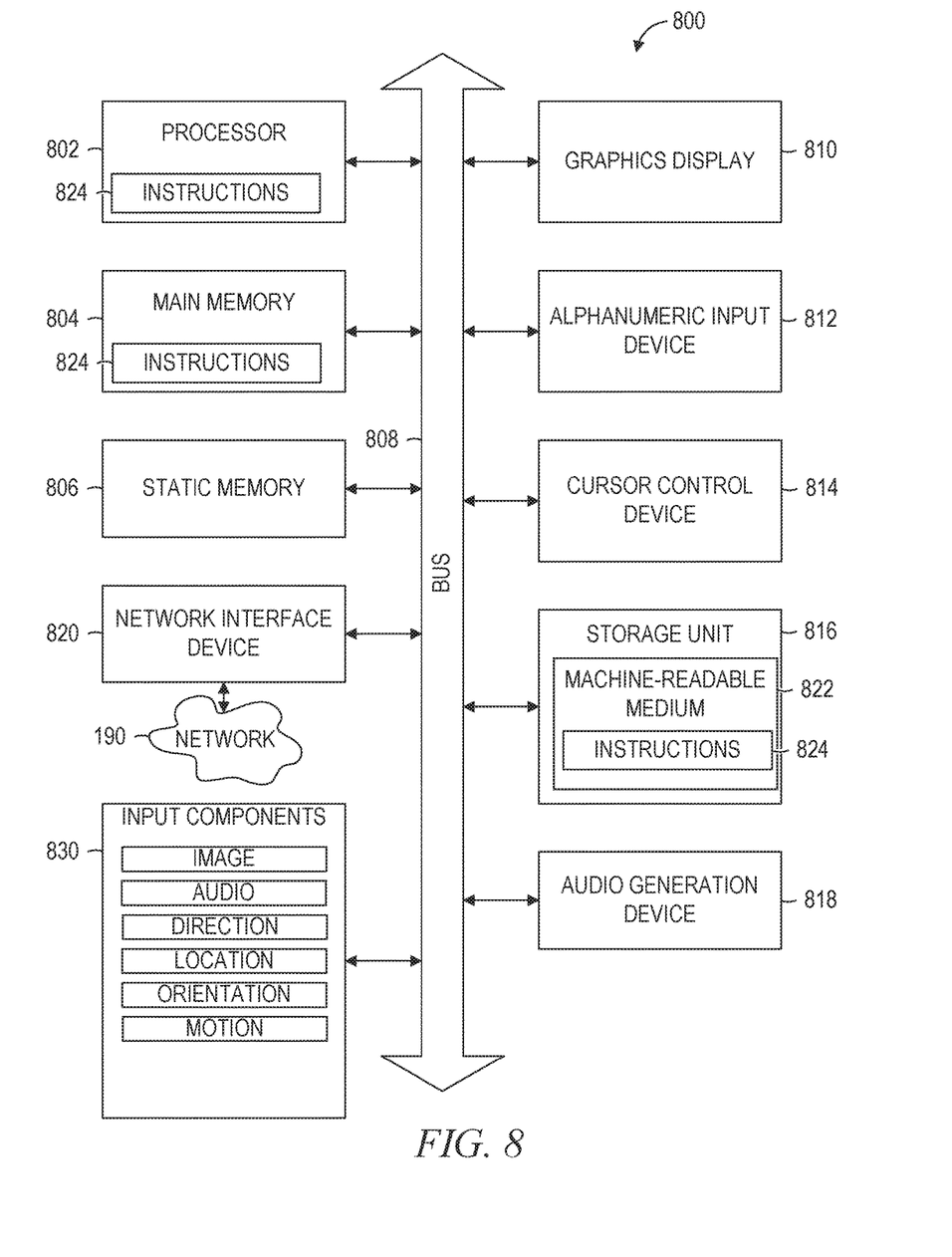
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an apples, an app, or other executable code) for causing the machine 800 to perform any one or more of the methodologies discussed herein may be executed, in whole or in part.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media). The instructions 824 may be transmitted or received over the network 190 via the network interface device 820. For example, the network interface device 820 may communicate the instructions 824 using any one or more transfer protocols (e.g., hypertext transfer protocol (HTTP)).

In some example embodiments, the machine 800 may be a portable computing device, such as a smart phone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), and a motion detection component (e.g., one or more accelerometers). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer system comprising:
   a processors;
   a memory device coupled to the processor and holding an instruction set executable on the processor to cause the computer system to perform operations comprising:
      detecting, by an alert manager application, receipt of a message including a selectable functionality for accessing an external resource, and message data indicative of a source of the message;
      predicting, by the alert manager application, an action time range during which a recipient of the message is likely to operate the selectable functionality, wherein the predicted action time range is measured from when the recipient accesses the message or from when a particular input pattern occurs;
      generating, by the alert manager application and within the predicted action time range, a visual message alert feature; and
      causing, by the alert manager application, the visual message alert feature to be presented on a display of the computer system during the predicted action time range.

2. The computer system of claim 1, wherein the predicting of the action time range comprises:
   accessing historical message interaction data associated with the recipient;
   comparing at least one interaction of the recipient with the message against at least a portion of the historical message interaction data; and
   predicting, based on the comparing, when operation of the selectable functionality by the recipient will likely occur.

3. The computer system of claim 2, wherein the comparing of the at least one interaction of the recipient with the message against at least the portion of the historical message interaction data comprises:
   determining that the at least one interaction of the recipient with the message matches a respective portion of the historical message interaction data, wherein the respective portion of the historical message interaction data corresponds to at least one historical message action that occurred.

4. The computer system of claim 1, wherein the generating the visual message alert feature comprises:
   generating a modification to an appearance of at least a portion of the selectable functionality that is included in the message.

5. The computer system of claim 1, wherein the generating the visual message alert feature comprises:
   generating a modification to a recipient input enabled to operate the selectable functionality included in the message.

6. The computer system of claim 1, wherein the selectable functionality is operable by a recipient of the message to access a resource network address of an external network resource.

7. The computer system of claim 6, wherein the operations further comprises:
   comparing text describing the external network resource to message data of the message; and
   determining, based on the comparing of the text to the message data, whether an extent of a discrepancy between the text describing the external network resource and the message data meets a suspiciousness threshold; and
   determining that the message is a suspicious message based on determining that the extent of the discrepancy exceeds a suspiciousness threshold.

8. A method comprising:
   detecting, by one or more processors of a machine, receipt of a message including a selectable functionality for accessing an external resource, and message data indicative of a source of the message;
   predicting, by the one or more processors of the machine, an action time range during which a recipient of the message is likely to operate the selectable functionality, wherein the predicted action time range is measured from when the recipient accesses the message or from when a particular input pattern occurs;
   generating, by the one or more processors of the machine and within the predicted action time range, a visual message alert feature; and
   causing, by the one or more processors of the machine, the visual message alert feature to be presented on a display of the computer system during the predicted action time range.

9. The method of claim 8, wherein the predicting of the action time range comprises:
   accessing historical message interaction data associated with the recipient;

comparing at least one interaction of the recipient with the message against at least a portion of the historical message interaction data; and predicting, based on the comparing, when operation of the selectable functionality by the recipient will likely occur.

10. The method of claim 9, wherein the comparing of the at least one interaction of the recipient with the message against at least the portion of the historical message interaction data comprises:

determining that the at least one interaction of the recipient with the message matches a respective portion of the historical message interaction data, wherein the respective portion of the historical message interaction data corresponds to at least one historical message action that occurred.

11. The method of claim 8, wherein the generating the visual message alert feature comprises:

generating a modification to an appearance of at least a portion of the selectable functionality that is included in the message.

12. The method of claim 8, wherein the generating the visual message alert feature comprises:

generating a modification to a recipient input enabled to operate the selectable functionality included in the message.

13. The method of claim 8, wherein the selectable functionality is operable by a recipient of the message to access a resource network address of an external network resource.

14. The method of claim 13, wherein the method further comprises:

comparing, by the one or more processors of the machine, text describing the external network resource to message data of the message; and determining, by the one or more processors of the machine, based on the comparing of the text to the message data, whether an extent of discrepancy between the text describing the external network resource and the message data meets a suspiciousness threshold; and determining that the message is a suspicious message based on determining that the extent of the discrepancy exceeds a suspiciousness threshold.

15. A non-transitory computer-readable medium storing executable instructions thereon that, when executed by a processor, cause the processor to perform operations including:

detecting receipt of a message including a selectable functionality for accessing an external resource, and message data indicative of a source of the message;

predicting an action time range during which a recipient of the message is likely to operate the selectable functionality, wherein the predicted action time range is measured from when the recipient accesses the message or from when a particular input pattern occurs;

generating, within the predicted action time range, a visual message alert feature; and causing the visual message alert feature to be presented on a display of the computer system during the predicted action time range.

16. The non-transitory computer-readable medium of claim 15, wherein the predicting of the action time range comprises:

accessing historical message interaction data associated with the recipient;

comparing at least one interaction of the recipient with the message against at least a portion of the historical message interaction data; and predicting, based on the comparing, when operation of the selectable functionality by the recipient will likely occur.

17. The non-transitory computer-readable medium of claim 16, wherein the comparing of the at least one interaction of the recipient with the message against at least the portion of the historical message interaction data comprises:

determining that the at least one interaction of the recipient with the message matches a respective portion of the historical message interaction data, wherein the respective portion of the historical message interaction data corresponds to at least one historical message action that occurred.

18. The non-transitory computer-readable medium of claim 15, wherein the generating the visual message alert feature comprises:

generating a modification to an appearance of at least a portion of the selectable functionality that is included in the message.

19. The non-transitory computer-readable medium of claim 15, wherein the generating the visual message alert feature comprises:

generating a modification to a recipient input enabled to operate the selectable functionality included in the message.

20. The non-transitory computer-readable medium of claim 15, wherein the selectable functionality is operable by a recipient of the message to access a resource network address of an external network resource, and the operations further include:

comparing text describing the external network resource to message data of the message; and determining based on the comparing of the text to the message data, whether an extent of a discrepancy between the text describing the external network resource and the message data meets a suspiciousness threshold; and determining that the message is a suspicious message based on determining that the extent of the discrepancy exceeds a suspiciousness threshold.

* * * * *